INVENTOR
GORDON J. DEBOO
BY
ATTORNEYS

INVENTOR
GORDON J. DEBOO
BY
ATTORNEYS

INVENTOR
GORDON J. DEBOO

BY
ATTORNEYS 3,493,901
GYRATOR TYPE CIRCUIT

Gordon J. Deboo, Sunnyvale, Calif., assignor to the United States of America as represented by the Administrator of the National Aeronautics and Space Administration Filed Mar. 5, 1968, Ser. No. 710,561
Int. Cl. H01p *1/24, 1/32*
U.S. Cl. 333—80 1 Claim

ABSTRACT OF THE DISCLOSURE

A gyrator circuit using operational amplifiers is used to replace an ungrounded inductor. By combining two separate gyrator circuits which have two operational amplifiers, only three operational amplifiers are required to produce the function and characteristics of an ungrounded inductor.

The invention described herein was made by an employee of the United States Government and may be manufactured and used by or for the Government for governmental purposes without the payment of any royalties thereon or therefor.

BACKGROUND OF THE INVENTION

Field of the invention

This invention relates in general to gyrator circuits using operational amplifiers, and relates more particularly to such gyrator circuits for replacing ungrounded inductors.

Description of the prior art

In the design of electric circuits, the factors of size, economy and reliability favor the use of integrated circuits. However, not all elements of such circuits are equally easy to fabricate by integration, and inductors in particular, especially if they are above a few microhenries in size, have proven difficult to produce on the same size scale possible with other integrated circuit components.

The prior art has approached this problem by replacing inductors by circuits or networks which perform as inductors but which do not require the use of inductors in the circuit. Many such networks are either of the type which perform the same electrical function as an inductor but use a different configuration, or those which both perform the same function and have a configuration similar to the inductor circuit which they are replacing.

An additional approach to the problem involves the use of so-called gyrator circuits which perform the functions of an inductor. Such gyrator circuits are either of the type employing operational amplifiers or those which do not use such amplifiers. Operational amplifiers have the desirable property of achieving stability through the use of large amounts of negative feedback, so their use is highly desirable. Heretofore, they had the disadvantages of relatively high complexity and cost which limited their application, but recently very simple operational amplifiers have been made available which make it possible to construct gyrator circuits with as few transistors as are required for gyrators which do not employ operational amplifiers.

SUMMARY OF THE INVENTION

In accordance with this invention, there is provided a gyrator circuit employing operational amplifiers. The invention is particularly adapted to produce an ungrounded inductor, since this may be done with the present invention utilizing only three operational amplifiers, instead of the four such amplifiers required by the prior art. By combining two gyrator circuits, each of which normally employs two operational amplifiers, a resultant circuit is produced which produces an ungrounded inductor using only three operational amplifiers.

It is therefore an object of the present invention to provide an improved gyrator circuit utilizing operational amplifiers.

It is a further object of this invention to provide a gyrator circuit utilizing operational amplifiers, the circuit requiring only three such amplifiers to produce an ungrounded inductor.

Objects and advantages other than those set forth above will be apparent from the following description when read in connection with the accompanying drawings, in which:

DESCRIPTION OF THE PREFERRED EMBODIMENT

Figure 1:
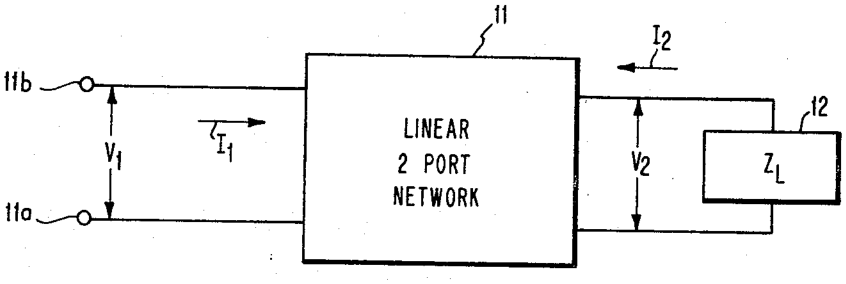
FIG. 1 is a block diagram illustrating the action of a gyrator circuit.

To aid in understanding the invention, the following considerations relative to gyrator circuits will be presented first. Consider the linear 2 port network 11 shown in FIG. 1, with a load impedance 12 represented by $Z_L$, and assume that network 11 is designed so that $$V_1 = -AI_2 \quad (1)$$

$$I_1 = BV_2 \quad (2)$$

where A and B are constants determined by the properties of network 11. Then the input impedance of the circuit looking into the lefthand port is $$Z_1 = \frac{V_1}{I_1} = \frac{A}{B} \times \left(\frac{-I_2}{V_2}\right) = \frac{A}{B} \cdot \frac{1}{Z_L} \quad (3)$$

If the impedance $Z_L$ is a capacitor of value C, then $$Z_1 = \frac{A}{B} \cdot j\omega C = j\omega \frac{AC}{B} = j\omega x \quad (4)$$

where $x$ is a constant.

This is then an inductive impedance, where $L = AC/B$. In a circuit using an inductor, the inductor can be removed and terminals 11*a* and 11*b* of FIG. 1 connected where the inductor was. The problem then is to devise a circuit which satisfies Equations 1 and 2 above, to provide a circuit which can be utilized to replace an inductor.

Figure 2:
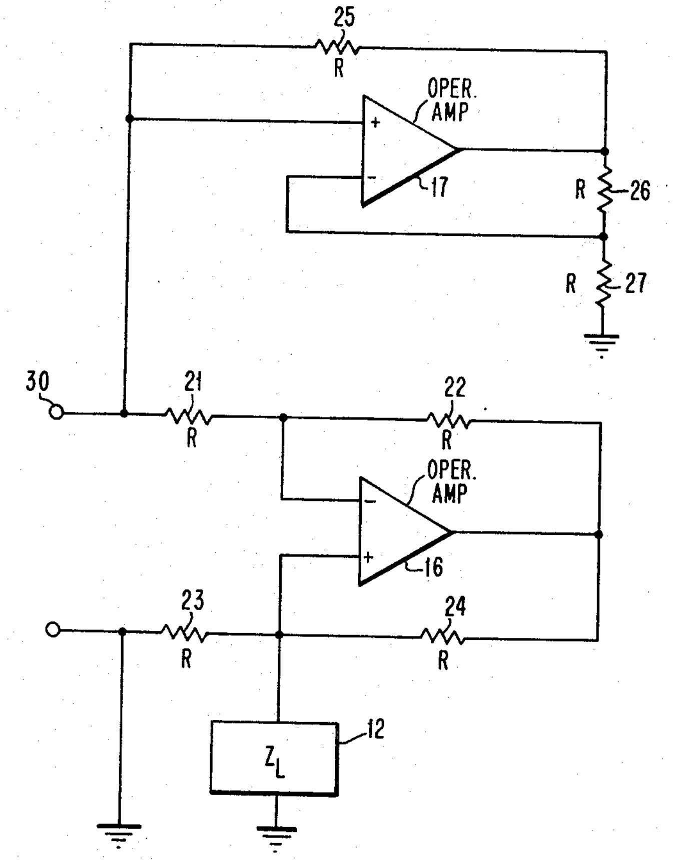
FIG. 2 is a schematic diagram of a gyrator circuit using two operational amplifiers.

Such a gyrator circuit is shown in FIG. 2 and employs two operational amplifiers 16, 17, as well as a plurality of resistors 21, 22, 23, 24, 25, 26, 27 each having a resistive value represented by R. It can be shown that the impedance between the terminal 30 and ground of the network of FIG. 2 can be represented by $$Z_1 = R^2/Z_L \quad (5)$$

By comparison with Equation 3 above, $R^2 = A/B$ and the device is a gyrator. For example, if $R = 10K$ and $Z_L$ is a capacitor having a value of 1000 picofarads, then from Equation 4, $$L=\frac{A}{B}\cdot C=(10^4)\times 10^{-9}=0.1 \text{ henry}$$

Figure 3:
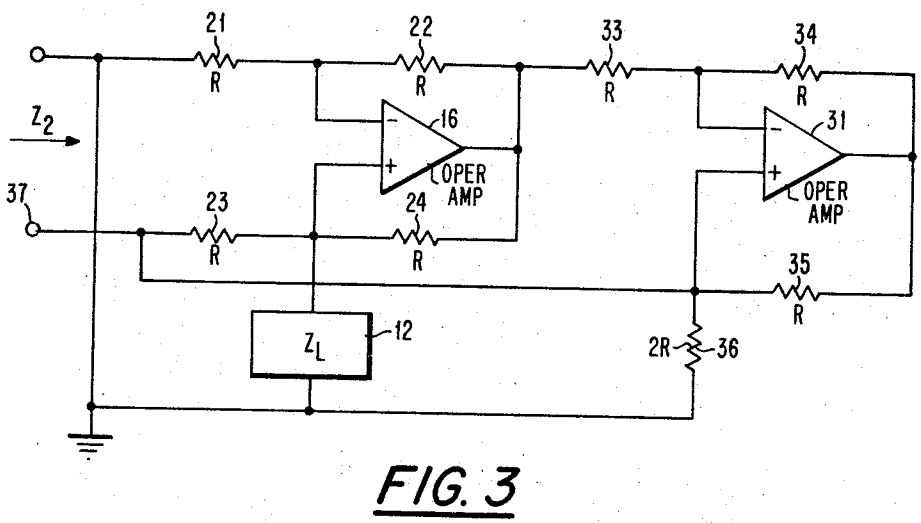
FIG. 3 is a schematic diagram of another gyrator circuit using two operational amplifiers.

Thus, the circuit of FIG. 2 can be used to produce an inductive impedance using only operational amplifiers, resistors and capacitors. However, it has the disadvantage that one of the two input terminals is grounded and it can therefore be used only where a grounded inductor is required.

Where an ungrounded inductor has been required, the prior art has employed two gyrator circuits, each employing two operational amplifiers and associated resistors. However, the present invention employs a second, different two-amplifier gyrator which is combined with the gyrator circuit shown in FIG. 2 in such way that the resulting circuit contains only three operational amplifiers. This second gyrator circuit is shown in FIG. 3 and includes the operational amplifier 16 and resistors 21, 22, 23, 24, as well as an operational amplifier 31 and resistors 33, 34, 35 and 36. It will be seen that the impedance between terminal 37 and ground is $Z_2=R^2/Z_L$, which is a result similar to Equation 4. The result is again the equivalent of a grounded inductor if the impedance $Z_L$ is a capacitor.

Figure 4:
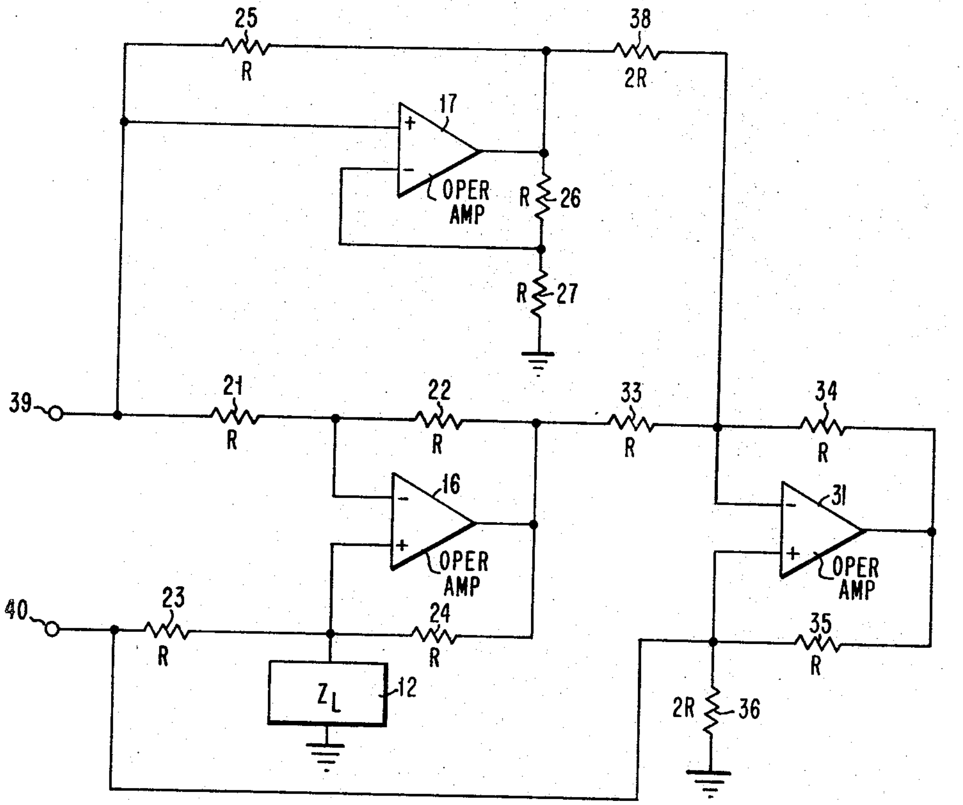
FIG. 4 is a schematic diagram of a gyrator circuit in accordance with this invention combining the circuits of FIGS. 2 and 3.

This circuit of FIG. 3 is combined with that of FIG. 2 to produce the resulting gyrator circuit shown in FIG. 4. This circuit includes the operational amplifiers 16, 17 and 31, resistors 21, 22, 23, 24, 25, 26, 27, 33, 34, 35, 36, and an additional resistor 38 having a value of 2R. It will be seen that amplifier 16 works with both amplifiers 17 and 31 simultaneously so that only three amplifiers are needed. It can be shown that the impedance from terminal 39 to ground, and from terminal 40 to ground, are both infinite, which is a requirement for a true floating inductor. Further, the impedance between terminals 39 and 40 is equal to $R^2/Z_L$ as before.

Figure 5:
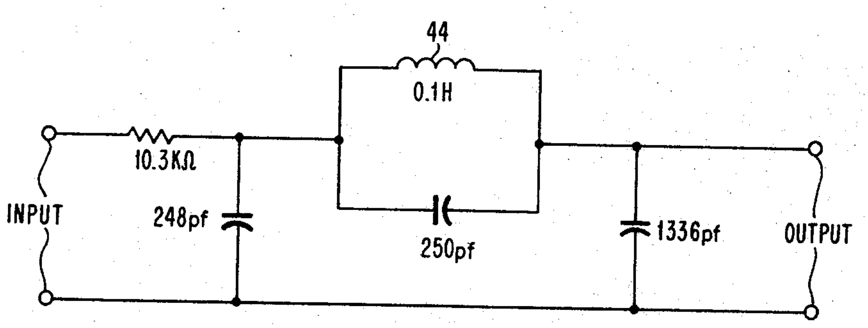
FIG. 5 is a schematic diagram of a filter circuit in which the gyrator circuit of this invention was used.

To demonstrate the use of the present invention, the filter shown in FIG. 5 was constructed using the teachings of this invention. In that circuit, the ungrounded inductor 44 having a value of 0.1 henry was replaced by the gyrator circuit shown in FIG. 4, with a value of R equal to 10 kilohms for the resistors and a capacitor of 1000 picofarads for the impedance $Z_L$.

Figure 6:
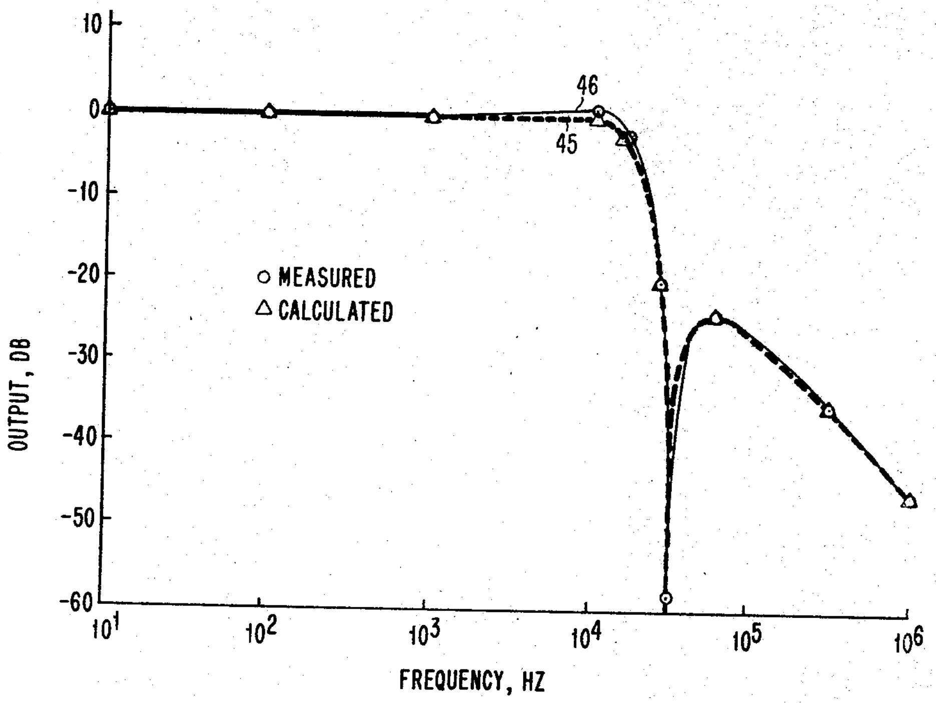
FIG. 6 is a graph showing a comparison between the calculated and the measured responses of the filter circuit of FIG. 5.

The open-circuit voltage transfer ratio of this filter was both calculated and measured, for the theoretical and experimental cases respectively, and the results are shown in the graphs of FIG. 6. In this figure, curve 45 represents the calculated values for the filter showing variations in output as a function of frequency. Curve 46 is a plot of the actual data obtained from the filter using the gyrator circuit of this invention, and it will be seen that the agreement between the two curves is excellent, thus substantiating the usefulness of the present invention to produce an ungrounded inductor using only three operational amplifiers.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A gyrator-type circuit for providing an ungrounded inductor comprising:
   - first, second and third operational amplifiers, each of said amplifiers having a first input terminal, a second input terminal, and an output terminal;
   - first and second circuit input terminals;
   - a first resistor coupled between said first circuit input terminal and said first input terminal of said first amplifier;
   - a second resistor coupled between said second circuit input terminal and said second input terminal of said first amplifier;
   - a third resistor coupled between said first input terminal of said first amplifier and said output terminal of said first amplifier;
   - a fourth resistor coupled between said second input terminal of said first amplifier and said output terminal of said first amplifier;
   - a fifth resistor connected between said output terminal of said first amplifier and said first input terminal of said second amplifier;
   - said second circuit input terminal being connected to said second input terminal of said second amplifier;
   - a sixth resistor coupled between said second circuit input terminal and ground;
   - a seventh resistor connected between said first input terminal of said second amplifier and said output terminal of said second amplifier;
   - an eighth resistor coupled between said second input terminal of said second amplifier and said output terminal of said second amplifier;
   - said first circuit input terminal being connected to said first input terminal of said third amplifier;
   - a ninth resistor connected between said first input terminal of said third amplifier and said output terminal of said third amplifier;
   - a tenth resistor coupled between said output terminal of said third amplifier and said first input terminal of said second amplifier;
   - eleventh and twelfth resistors connected in series between ground and said output terminal of said third amplifier;
   - said second input terminal of said third amplifier being connected to the junction of said eleventh and twelfth resistors;
   - said sixth and tenth resistors each having double the resistance of said other resistors; and
   - a capacitive impedance connected between said second input terminal of said first amplifier and ground, whereby said circuit appears across said circuit input terminals as an ungrounded inductor.

References Cited

UNITED STATES PATENTS 3,098,978 7/1963 Sipress ............ 333—24 X

ELI LIEBERMAN, Primary Examiner

PAUL L. GENSLER, Assistant Examiner

U.S. Cl. X.R.

307—230